United States Patent [19]
Huffman

[11] 3,786,924
[45] Jan. 22, 1974

[54] WATER PURIFICATION SYSTEM

[75] Inventor: Lowell E. Huffman, Wilmington, Del.

[73] Assignee: Delro Inc., New Castle, Del.

[22] Filed: July 22, 1971

[21] Appl. No.: 164,991

[52] U.S. Cl.................. 210/257, 210/258, 210/321
[51] Int. Cl............................................ B01d 31/00
[58] Field of Search..... 210/23, 321, 257, 258, 490, 210/491, 500

[56] References Cited
UNITED STATES PATENTS

| | | | |
|---|---|---|---|
| 3,630,378 | 12/1971 | Bauman | 210/321 X |
| 1,825,631 | 9/1931 | Horvath | 210/321 X |
| 3,355,382 | 11/1967 | Huntington | 210/22 |
| 3,365,061 | 1/1968 | Bray | 210/130 |
| 3,493,496 | 2/1970 | Bray et al. | 210/23 |
| 3,505,216 | 4/1970 | Kryzer | 210/23 |
| 3,589,862 | 6/1971 | Veloz | 21/102 |
| 3,679,055 | 7/1972 | Clark et al. | 210/257 X |

*Primary Examiner*—Frank A. Spear, Jr.
*Attorney, Agent, or Firm*—Synnestvedt & Lechner

[57] ABSTRACT

A water purification system incorporating a reverse osmosis unit for purifying water is disclosed. The system yields two streams, one of very high purity for drinking and cooking and the like and one of lower quality for use in toilet tanks, lawn watering, garden irrigation and the like. The system provides apparatus and techniques for reconciling the varying flow rates inherent in a domestic water system with the constant flow rate desirable for efficient performance of the reverse osmosis unit. Provision is made for automatic flushing and backwashing of the reverse osmosis element.

14 Claims, 1 Drawing Figure

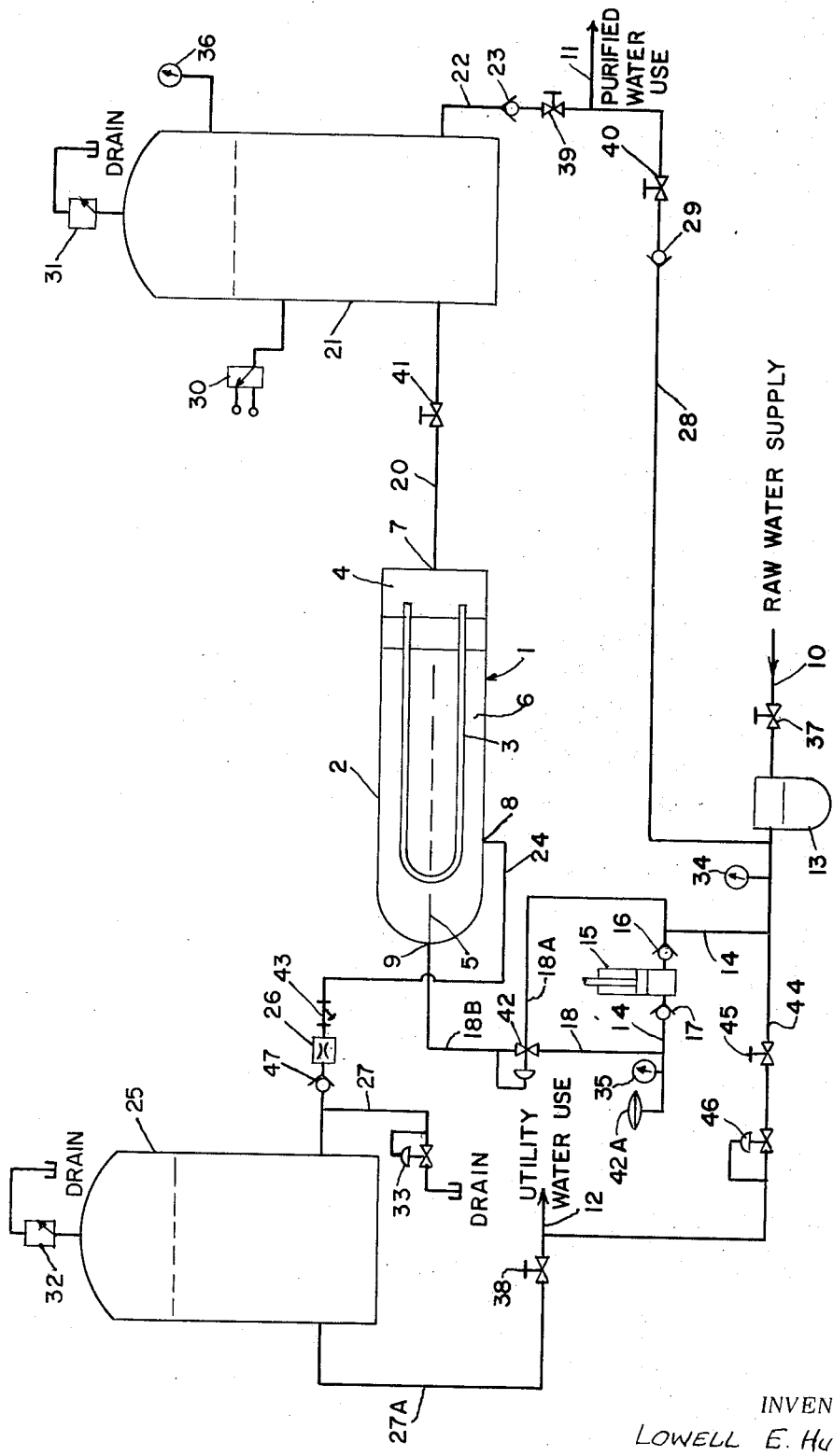

WATER PURIFICATION SYSTEM

FIELD OF THE INVENTION

This invention relates to water purification systems, and in particular, to systems which utilize the principle of reverse osmosis to produce water of high purity from a raw water supply or source having relatively high dissolved solids content.

BACKGROUND OF THE INVENTION

The present invention is of particular utility in the field of domestic water supply, although various aspects of the invention may be exploited to advantage in other fields. One of the characteristics of the domestic water supply field is that some of the variety of uses to which water is put in the home make it desirable or necessary to have very pure water while for other uses water of considerably lower quality is perfectly satisfactory. For example, it is desirable to have water of good taste, high purity and low hardness for drinking and cooking. For laundering and bathing, low hardness is desirable, although taste is of no importance. On the other hand, for toilet tanks, lawn watering, garden irrigation, car washing, etc., water of much lower quality than that required for drinking and cooking will suffice.

Heretofore ion-exchange type water softeners have been the principal devices used domestically to upgrade water quality. They do so by removing the dissolved solids causing water hardness. One characteristic of ion exchange units is that they must be periodically regenerated, which presents the home owner with a continuing maintenance problem. Furthermore, ion exchange type water purifying units do not act as filters to remove suspended solids or organic material and the regenerate stream is unusable waste.

Reverse osmosis as a water purification technique has been known for some considerable time for industrial applications. However, the fact that two product streams, one of high purity, termed "permeate", and one of lower purity than the feed water stream, termed "concentrate", are produced has presented a barrier to the application of reverse osmosis to domestic water supply systems.

In addition, since reverse osmosis units act as very fine filter elements to undissolved solids, they must be cleaned from time to time to clear the solids buildup. Finally, it is a characteristic of domestic water systems that rates of usage vary widely and sporadically, while reverse osmosis units, which rely on pressure and flow to effect purification, are most effective under steady state or quasi steady state conditions. All of these factors have combined to discourage use of reverse osmosis as a technique to provide high quality water for domestic use, since the ordinary home owner has no interest in performing such chemical engineering duties as disposal of concentrate waste, or adjustment of flow rates to accommodate filter unit capacity to demand, but instead desires an automatic system requiring the absolute minimum of attention.

SUMMARY AND OBJECTS OF THE INVENTION

In accordance with the present invention a water purification system is provided utilizing the technique of reverse osmosis as the principal water quality upgrading process, which system yields two streams, one of very high purity for drinking, cooking, laundering, and bathing, and one of lower quality for utility use such as toilet tanks, lawn watering, garden irrigation, car washing, etc. The streams are provided at appropriate pressures and flow rates for domestic use and means are provided for reconciling the widely varying rates of usage inherent in a domestic water system with the constant flow rate conditions desirable and necessary for efficient performance of reverse osmosis. In addition, the invention provides for automatic flushing of the reverse osmosis element, thereby greatly extending its service life. All of the foregoing is provided in accordance with the invention in a system which is completely automatic in operation.

It is an object of the present invention to provide a water purification system producing high quality water for human consumption.

A further object of the invention is the provision of a water purification system using reverse osmosis, which system conserves overall water consumption by utilizing the concentrate stream for utility purposes instead of disposing of it as waste.

A further object of the invention is the provision of an automatic domestic water purification system which is automatic in operation and in which the reverse osmosis element has an extended service life.

The manner in which the foregoing objects are accomplished in accordance with the invention may be understood by a consideration of the detailed description which follows together with the accompanying drawing which illustrates a preferred embodiment of the invention in simplified flow diagram form.

DETAILED DESCRIPTION

Osmosis is a natural physical process in which a solvent common to two solutions of different concentration located on opposite sides of a semi-permeable membrane flows through the membrane in the direction which will tend to equalize the concentration of the two solutions. For example, in the absense of external forces, substantially pure water (i.e., an extremely dilute solution of salts) will flow through a semi-permeable membrane into a relatively concentrated salt solution, thus diluting the salt solution to make it more nearly pure water, and concurrently concentrating the "pure" water into a more concentrated solution of salts.

Reverse osmosis is a process in which pressure is applied to a salt solution on one side of a semi-permeable membrane in an amount sufficient to overcome the natural osmotic flow described above, and sufficient to cause a flow of solvent (water) through the membrane. At the same time, if the salt solution contains undissolved solids, a mechanical filtering action occurs at the membrane and the water passing through it is separated from the undissolved solids as well as the dissolved solids. The substantially pure solvent (or more rigorously, the extremely dilute solution) passing through the membrane in the reverse osmosis process is termed permeate. Unlike a simple filtering operation, the reverse osmosis process involves forcing less than all of the solvent through the membrane. There thus results a second stream of solution from the unit more concentrated than the initial salt solution. This stream is termed "concentrate".

The semi-permeable membranes used for water purification purposes are usually constructed of cellulosic materials. Various structural arrangements of the membrane have been employed, including the mounting of the membrane on the exterior or interior of a porous core tube; spiral mounting of a membrane sheet and backing material around a slotted core tube with permeate flow within the membrane in a direction orthogonal to feed and concentrate flow; and membranes in the form of bundled open ended fibers in which the fibers are semipermeable and are believed to be individually coated or otherwise covered with a film of the membrane material. The present invention may be practiced with any of the various structures just described, but the preferred embodiment employs the last mentioned fiber bundle type. Such permeators are sold by the DuPont Company under the trademark PERMASEP.

Attention is now directed to the flow diagram of the drawing. The system there illustrated includes a reverse osmosis unit (permeator) designated generally as 1 comprising a cylindrical housing 2 containing a bundle of open ended fibers 3, a permeate accumulation space 4 in communication with the open ends of the bundled fibers, a porous feed tube 5 extending into the bundle of fibers for delivering feed stock to them, a shell space 6 to provide a flow path for concentrate, a permeate outlet 7, a concentrate outlet 8, and a feed water inlet 9.

Raw water is supplied to the system at a delivery point 10. The source of water may be public mains, a well or a pond. Pure water, i.e., permeate, leaves the system at delivery point 11, and utility water leaves the system at delivery point 12. In order to exploit the invention to its fullest advantage, it is necessary that the plumbing system into which it is connected be of the split type. The piping connected to delivery point 11 leads to wash basins, kitchen sinks, laundry tubs, bath tubs, shower stalls, drinking fountains, ice cube makers and the like. The piping connected to delivery point 12 leads to toilet tanks, outdoor faucets, lawn sprinker systems, lawn fountains, potting shed sinks, water troughs, fire sprinkler systems, fire hydrants, air conditioning cooling towers, and the like. In the present discussion, delivery points 11 and 12 will be treated as the points of use of purified water and utility water respectively, since the building plumbing systems and the various water using appliances form no part of the invention thereof.

Equipment is provided for delivering raw water from point 10 to the feed water inlet 9 of the permeator 1 through pump 15. Just downstream from delivery point 10 is mechanical filter 13. Filter 13 may be of standard configuration, and its purpose is twofold; that is, to remove the larger dispersed solids from the water stream so that fewer of them need be removed by the permeator 1 and to protect pump 15. In this manner, the service lives of the permeator and the pump are longer than they would otherwise be.

Starting downstream from filter 13, the delivery path to inlet 9 includes conduit 14 and pressure pump 15. Check valves 16 and 17 are provided upstream and downstream from pressure pump 15. Conduit 14 is connected to conduit 18 which leads to pump pressure regulator valve 42. Pressure regulator valve 42 is provided with a bypass line 18A which leads back to the suction side of the pump. The pressure regulator valve is set to divert excess flow through the line 18A back to the suction side of the pump at a predetermined pressure thereby preventing an overload condition in the permeator. At pressures below the predetermined pressure all of the flow is from the line 18 through the line 18B to the feed water inlet 9 of the permeator 11.

Although various types of pumps may be employed, pump 15 is typically a positive displacement piston operated pump. When such a pump is employed, an accumulator 42A is provided which minimizes pressure surges in the permeator.

The capacity of the pump will depend upon the particular size water treating system involved; for illustration, in a typical domestic installation, a pump with a delivery rate of two gallons per minute at 400 psi is satisfactory.

Connected to the permeate outlet 7 of permeator 1 is conduit 20 for delivering permeate to permeate surge tank 21. Tank 21 is preferably a generally upright cylindrical tank, which may be glass lined. It should be capable of withstanding reasonably high internal pressures such as 150 psi. Tank 21, in accordance with the invention, performs two functions. One is to provide a reservoir of pure water so that such water may be used for a time at a rate greater than the permeate delivery rate of the permeator. The larger tank 21 is, the longer such a high rate can be sustained. The second function served by tank 21 is that of a pressurizing device for establishing and maintaining a pressure in the pure water adequate to deliver it to point of use 11, and preferably to the various water-using appliances in the pure water plumbing system of the building. If the pressure established by the air head in tank 21 is inadequate for the latter purpose, a booster pump may be employed. Another purpose for pressuring the pure water by means of air padded surge tank 21 is to provide a driving force for back cleaning the membrane element of the permeator of both dissolved solids and undissolved solids at times when pump 15 is not operating. In order to achieve the pressurizing function of tank 21, it should be positioned in an upright manner to assure the definite creation of an air head in the upper portion of the tank. The pressurized air head may be from either entrapped air as the tank is filled or by the addition of pressurized air.

While it is preferred that permeate reservoir capacity and permeate pressurizing capability be provided by use of a surge tank, as just explained, these functions can be achieved by other equipment arrangements. For example, an elevated unpressurized storage tank can be employed.

The purified water or permeate is delivered from the surge tank 21 to point of use 11 through line 22 which contains the check valve 23.

Connected to concentrate outlet 8 of the permeator 1 is conduit 24 which delivers concentrate to concentrate surge tank 25. An orifice valve 26 is mounted in conduit 24 for purposes to be discussed later herein. Strainer 43 is provided to protect orifice valve 26. Tank 25, like tank 21, is preferably a generally upright cylindrical tank capable of withstanding high internal pressures. Tank 25 performs two functions. It serves as a reservoir for concentrate or utility water so that utility water may be used at a flow rate greater than the concentrate delivery rate from the permeator for a time. As is the case of tank 21, the larger the tank 25 is, the longer high flow rates can be sustained in the utility water system. The other function of tank 25 is to serve as a pressurizing device to supply the driving force necessary to deliver utility water to point of use 12, and preferably through the utility water plumbing system to the various water-using appliances connected thereto. Once again, a booster pump may be provided in the utility water system for the latter purpose if the pressure supplied by the air head in tank 25 is not adequate.

It is preferred that concentrate pressurizing capability and concentrate reservoir capacity be provided by use of the surge tank as described, but other equipment may be employed for these functions. For example, an elevated unpressurized storage tank can be used.

Conduit 27a is connected to surge tank 25 for delivering concentrate or utility water to point of use 12.

In some case, it may be desirable to provide a bypass from the raw water supply to the point of use. As shown on the drawings, a bypass 28 is connected between a point just downstream from filter 13 and point of purified water use 11. It contains a check valve 29 and a manually operated valve 40. Because of the check valve, no flow is permitted through the bypass line 28 until the pressure in tank 21 drops below the pressure of the raw water supply.

It is also desirable in some cases to provide a bypass line between the raw water supply and the utility water use point. For this purpose, in the drawings, a line 44 is shown leading from the line 14 to utility water use pont 12. Line 44 is provided with a manually operable valve 45. A pressure regulator valve 46 is set to prevent flow through the line 44 until the pressure in tank 25 drops to a preselected level.

The principal control device of the system is pressure responsive control switch 30 which is positioned to respond to the pressure in permeate surge tank 21. Pressure operated switch 30 is of known type and is calibrated to close the electric circuit to the motor of pump 15 when the pressure in tank 21 falls to a selected level and to open that circuit when such pressure rises to another selected level. The remaining control equipment includes pressure relief valve 31 for surge tank 21 and pressure relief valve 32 for surge tank 25, each of which is fitted to relieve pressure from the tanks in the event the pressure within either tank exceeds a selected safety level.

One other piece of control equipment may optionally be included in systems where it is foreseeable that the ratio of purified water use to utility water use in a given period of time will often exceed the ratio of permeate production to concentrate production. In such an installation, more utility water will ordinarily be produced than can be used. In the absence of additional control equipment, pressure relief valve 32 would periodically operate to discharge the unneeded utility water to the sewer. However, in accordance with the invention, a pressure responsive valve designated in the drawing as 33 can be connected to conduit 24 via conduit 27. In this manner excess utility water may be drawn off to the sewer at a selected rate without causing operation of safety valve 32.

Check valve 47 in conduit 24 will prevent flow from tank 25 backward into the shell of permeator 1 during the off cycle of pump 15.

Three pressure gauges are provided for monitoring purposes. Additional gauges may be employed at other points in the system if desired. Gauge 34 reports water supply pressure downstream from filter 13; gauge 35 reports water pressure downstream from pump 15; and gauge 36 reports pressure in surge tank 21.

Valves 37, 38 and 39 are provided for isolating the equipment from the supply main and the split plumbing system for maintenance, etc. In addition, a valve 41 in the line 20 is provided to prevent flow from tank 21 to the permeator when permeator maintenance is necessary.

With the foregoing description of the equipment of the invention in hand, its mode of operation may be outlined. When, because of pure water demand at use point 11, or during initial start-up, the pressure in permeate surge tank 21 falls low enough (about 40 psi) to actuate switch 30 to start pump 15, raw water enters the system at point 10, passes through filter 13, and is delivered by pump 15 to feed water inlet 9 of the permeator, under a pressure of approximately 400 psi. In a typical case where brackish water of less than 2000 ppm total dissolved solids is the feed water, then reverse osmosis takes place, and substantially pure water passes through the permeator element 3 into head space 4 and thence into surge tank 21, tending to raise the pressure inside the tank. Pump 15 operates until the pressure in tank 21 reaches a selected level, such as 60 psi whereupon pressure operated switch 30 turns the pump off. Such a pressure rise occurs when permeate production exceeds pure water demand.

Concurrently with the production of permeate and its delivery to permeate surge tank 21, there is produced a stream of concentrate which leaves the permeator unit 1 through concentrate outlet 8. It is reduced in pressure to a level more suitable for utility water use as it passes through the orifice 26 and is delivered to the concentrate surge tank 25. As concentrate accumulates in surge tank 25, a pressure head is developed in that tank by compression of air in the air head space.

The operating conditions just described are those obtaining under one typical condition of water use, that of a demand for pure water at point of use 11 and no concurrent demand for utility water at point of use 12. When such a condition continues to a point where the pressure in concentrate surge tank 25 rises to the operating pressure of valve 33, the valve opens and a portion of the concentrate is delivered to the drain. (If the system is one in which valve 33 is omitted, the excess concentrate is delivered to the drain through safety valve 32.) However, if concurrently with demand for pure water at point of use 11, there is a demand for utility water at point of use 12, the removal of water through point 12 will delay or even prevent a pressure rise in concentrate surge tank 25 to the point where valve 33 opens. This operating condition of simultaneous demand for pure water and utility water, like the first described condition, occurs often enough to be regarded as a normal operating condition.

Another normal operating condition is one where there is no demand for pure water, or a demand small enough to be met solely from the reservoir of permeate in surge tank 21, but there is a substantial demand for utility water, one greater than can be met from the reservoir of concentrate in surge tank 25.

In this event, raw water passes through check valve 16, the pump 15, the check valve 17, through the conduit 18 to the permeator shell and out through conduit 24 to the utility tank. In cases where the rate of consumption of utility water is high, the replacement of water through the path just described may be inadequate because of the constriction of orifice 26. In that event, it is usually desirable to include the bypass conduit 44 described above. As previously explained, conduit 44 is provided with a pressure regulator valve 46 which is set to open at a predetermined pressure somewhat below the supply pressure. So long as the pressure in the utility water reservoir 25 exceeds the raw water supply pressure, the pressure regulator valve 46 remains closed and there is no flow through the bypass line. However, if a high rate of use of utility water depletes the pressure to a point below the preselected pressure, then, pressure regulator valve 46 opens and raw water flows through the bypass line 44 to the point of use 12.

In accordance with the invention, the condition of flow through the pump and permeator to tank 25 produces a flushing of the permeate bed. Both dissolved and undissolved solids, resulting respectively from the filtering action of the bed and the reverse osmosis action of the bed, are swept out of the bed and into the utility water system. The arrangement of surge tank 25 so that its lower portion acts as a sediment trap effectuates the removal of the undissolved solids swept out of the permeator. It should be noted that such sweeping of the permeator bed also occurs under the less typical condition previously described of very high demand for both utility water and pure water. In accordance with the invention this permeator sweeping action cleans the permeator and extends its useful life. A long permeator element life, of great importance in a domestic system, is thus automatically obtained.

One other operating condition is of frequent occurrence and of considerable importance, because it involves another feature of the invention. This condition is one in which there is little or no pure water demand and no utility water demand, or a demand small enough to be met from surge tank 25. Under these conditions the pressure in permeate accumulation space 4 will be greater than that in the permeate unit 3, and this pressure, when combined with the natural osmotic pressure will cause a natural forward osmotic flow of permeate into and through the permeator unit 3 and ultimately out the concentrate outlet 8 into the surge tank 25. This flow is not of great volume, but it is important because it forces highly concentrated solution out of the permeator unit. Another benefit of the forward osmosis action is the removal of a film of undissolved solids that may have accumulated on the outer surfaces of the fibers 3 during the reverse osmotic flow mode. It has been found that a permeator unit of the bundled fiber type described above is very effective for achieving the benefits just described in that with these units substantial natural or forward osmosis action can take place without damage to the membrane structure.

It can be seen from the foregoing that the present invention provides an adequate supply of pure water and utility water under substantially all conditions of water demand despite the widely varying rates of the two kinds of demand. It can also be seen that the system automatically performs these functions and automatically provides for flushing of the permeator unit by two different mechanisms, thereby extending its life and minimizing maintenance.

It should be evident that the use of the invention leads to a reduction in the total water treatment required. For example, the unit may be used in areas where the subsurface water is too high in salt content for human use but adequate for many household uses. The invention separates the salt from the pure water in such areas and provides adequate water for human consumption. Each of the concurrent streams produced by the invention can find useful applications in a residence and the used water returned to a septic tank. Following purification it can be drained back into its original ground environment. This contrasts to techniques which involve the flushing away through appropriate drains to some remote location of the less pure water. In the use of such systems the water removed from the ground is usually replaced from water from underground sources that are frequently higher in content and the quality of the ground water deteriorates.

I claim:

1. A system for concurrent production of high purity water substantially free of dissolved and undissolved solids for uses requiring high purity and utility water for uses not requiring such high purity, comprising: a reverse osmosis unit having a feed water inlet, a permeate outlet, a membrane structure between the feed water inlet and the permeate outlet, said reverse osmosis unit further having a concentrate outlet upstream from the membrane structure in fluid communication with the feed water inlet; conduit means for delivering raw water from a supply source to said feed water inlet; a pump in said conduit means for establishing, when in operation, a pressure gradient across said reverse osmosis unit from a feed water inlet to permeate outlet; a permeate surge tank connected to said permeate outlet and having outlet means for delivering permeate to a point of use, said surge tank comprising means for maintaining the permeate outlet under a pressure proportional to the quantity of permeate in the tank, and pressure responsive means for activating and deactivating the pump in response to preselected levels of vessel pressure; and means isolating said permeate surge tank from the feed water conduit except through the reverse osmosis unit.

2. A system according to claim 1 further comprising a concentrate surge tank connected to said concentrate outlet and having outlet means for delivering concentrate to a point of use, a bypass means interconnecting the source of supply and the point of use of concentrate and means disabling flow through the bypass means except when the pressure in the concentrate surge tank drops to source pressure.

3. A system according to claim 1 wherein said reverse osmosis membrane structure comprises porous fibers individually covered with a semipermeable membrane with the membrane in fluid contact with the feed water inlet and the ends of the fibers in communication with the permeate outlet.

4. A system according to claim 1 wherein the pressure responsive means for activating the pump comprises a pressure responsive device responsive to the pressure between the permeate outlet and the surge tank outlet for activating the pump when said pressure falls to a selected level.

5. A system according to claim 1 wherein said pump is a positive displacement pump.

6. A system according to claim 5 wherein said pump is a piston pump.

7. A system according to claim 1 wherein the pressure in the surge tank with the pump deactivated is greater than the pressure at the permeator inlet whereby a forward osmotic flow to the concentrate side of the permeator takes place when the pump is deactivated.

8. A system for producing high purity water substantially free of dissolved and undissolved solids for uses requiring high purity, and for producing water for uses not requiring such high purity, comprising: a reverse osmosis unit having a feed water inlet, a permeate outlet, a membrane structure between the feed water inlet and the permeate outlet and a concentrate outlet upstream from the membrane structure; means for interconnecting the feed water inlet of said reverse osmosis unit with said water supply including a pump, said means being arranged to deliver water to the feed water inlet irrespective of pump operation, said pump when in operation establishing a pressure gradient across said reverse osmosis unit from feed water inlet to permeate outlet; a permeate surge tank for receiving permeate from said permeate outlet; permeate surge tank outlet means for delivering permeate to point of use; a concentrate surge tank connected to said concentrate outlet for receiving concentrate from said reverse osmosis unit; concentrate surge tank outlet means for delivering concentrate to a point of use; control means for activating said pump and means including said permeate surge tank for reversing the pressure gradient across said reverse osmosis unit when the pump is not in operation.

9. A system according to claim 8 further including a pressure reducing orifice between the reverse osmosis unit and the concentrate surge tank.

10. A system for producing high purity water or the like substantially free of dissolved solids for uses requiring high purity and water for uses not requiring such high purity, comprising: a reverse osmosis unit having a feed water inlet, a permeate outlet, a membrane structure between the feed water inlet and the permeate outlet, a concentrate outlet upstream from the membrane structure; means operable in response to permeate demand for establishing a pressure gradient across said reverse osmosis unit from feed water inlet to permeate outlet and in the absence of permeate demand to reverse the pressure gradient; valving for directing the permeate which flows by osmosis to the inlet side of the reverse osmosis unit when the pressure gradient is reversed, through the concentrate outlet; and a concentrate storage tank having an outlet leading to a point of use and an inlet at the bottom of said tank, said inlet being connected to the concentrate outlet for receiving water therefrom, and an orifice between the concentrate outlet and the concentrate storage tank for ordinarily establishing a pressure gradient between the concentrate outlet and concentrate storage tank.

11. A system according to claim 10 wherein said membrane structure comprises porous fibers individually covered with semipermeable membranes.

12. Apparatus according to claim 10 further including pressure responsive relief valve means downstream from the orifice for limiting te pressure in the concentrate storage tank, said pressure responsive relief valve means permitting the flow of concentrate through the concentrate outlet under conditions of low concentrate demand relative to concentrate production.

13. Apparatus according to claim 12 further including a bypass conduit for connecting the raw water supply with the point of use of concentrate water, and a pressure regulating means for connecting said conduit with the point of use when the pressure in the concentrate tank falls to a predetermined level.

14. Apparatus according to claim 10 further including a permeate storage tank, an inlet at the bottom of the storage tank connected to the permeate outlet, and an outlet at the bottom of the permeate storage tank for connection to a point of use of permeate.

* * * * *

UNITED STATES PATENT OFFICE
CERTIFICATE OF CORRECTION

Patent No. 3,786,924     Dated January 22, 1974

Inventor(s) Lowell E. Huffman

It is certified that error appears in the above-identified patent and that said Letters Patent are hereby corrected as shown below:

Column 10, line 24, "te" should read --the--.

Signed and sealed this 17th day of September 1974.

(SEAL)
Attest:

McCOY M. GIBSON JR.
Attesting Officer

C. MARSHALL DANN
Commissioner of Patents